Aug. 2, 1966          E. K. HANSEN            3,264,026
           HOOK ATTACHMENT FOR A FORK LIFT VEHICLE
                     Filed April 27, 1962
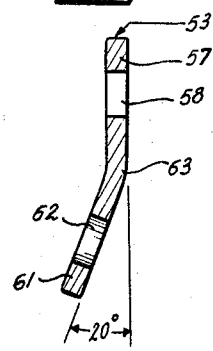
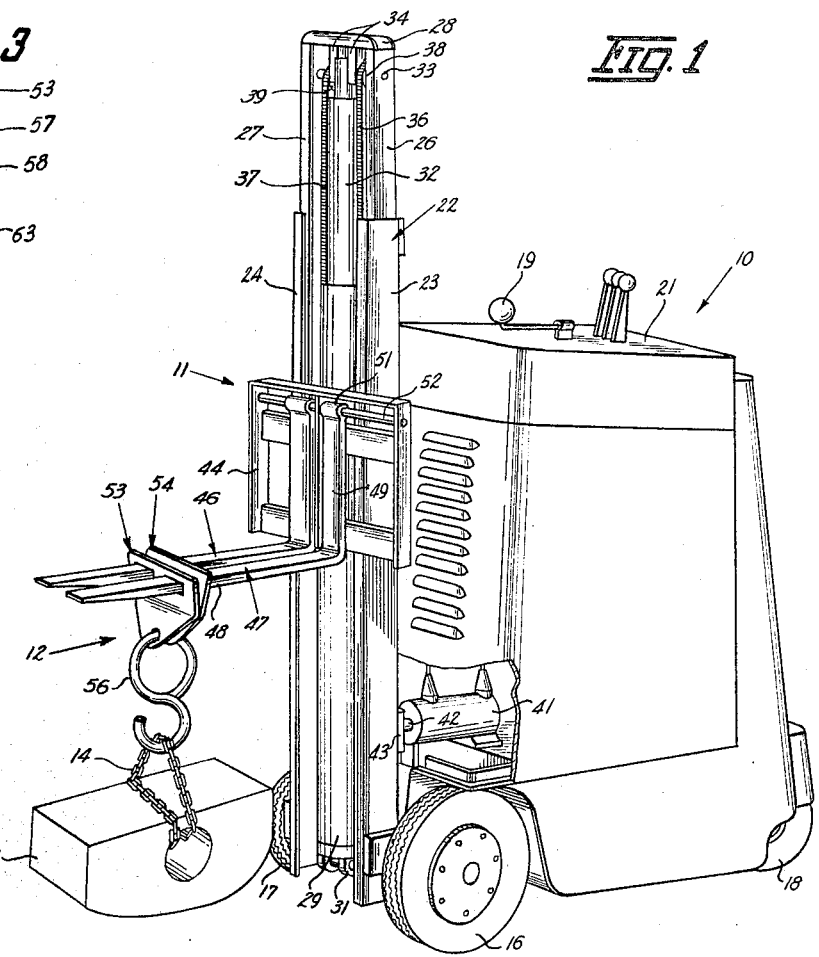
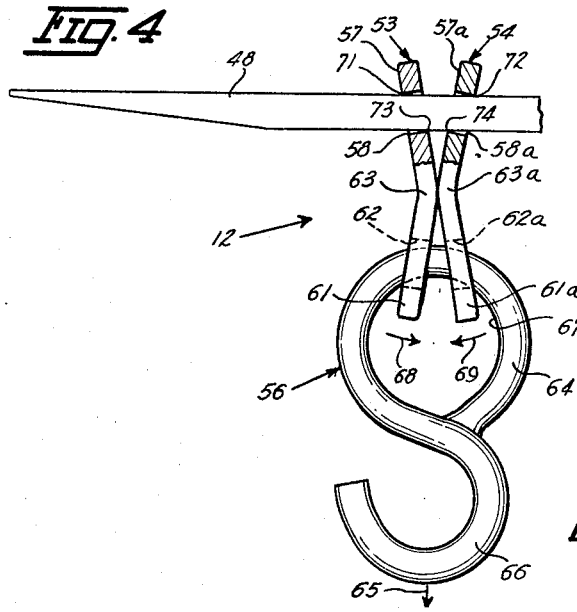
INVENTOR.
ELMER K. HANSEN
BY Rudolph L. Lowell
ATTORNEY.

United States Patent Office 3,264,026
Patented August 2, 1966

3,264,026
HOOK ATTACHMENT FOR A FORK LIFT
VEHICLE
Elmer K. Hansen, 801 S. Martha,
Sioux City, Iowa
Filed Apr. 27, 1964, Ser. No. 362,743
3 Claims (Cl. 294—2)

This invention relates to accessory equipment for an article lift vehicle and more particularly to a hook attachment mountable on the lift forks of a fork lift-type vehicle.

It is the object of this invention to provide an improved hook attachment for an article lift truck.

Another object of the invention is to provide a hook attachment which is adjustable along and self-locking on the fork of a fork lift vehicle and is readily released and removable from the fingers.

Still another object of the invention is to provide a hook attachment having a locking action with the forks of a fork lift vehicle which is increased as the load on the attachment is increased.

A further object of the invention is to provide a hook attachment for use with all types of fork lift vehicles having at least one lift fork.

An additional object of the invention is to provide a rugged hook attachment for a fork lift vehicle which is constructed from a minimum number of parts and is reliable and safe in use.

These and other objects and advantages of this invention will become readily apparent from a consideration of the following detailed specification relating to the accompanying drawing, wherein:

FIG. 1 is a perspective view of a fork lift truck with the hook attachment of the invention assembled thereon;

FIG. 2 is a plan view of one of the holding plates of the hook attachment of FIG. 1;

FIG. 3 is a sectional view taken along the line 3—3 in FIG. 2; and

FIG. 4 is an enlarged side view partially in section of the hook attachment in assembled relation with the forks.

Referring to the drawing, there is shown in FIG. 1 a motor vehicle 10 in the form of an article lift truck equipped with a fork and carriage assembly 11 in assembled relation with the hook attachment 12 of this invention. An article 13 is attached by a chain 14 to the hook attachment 12. The article 13 is moved to an elevated position in response to upward movement of the fork and carriage assembly 11 and is pendently supported therefrom by the hook attachment 12 and chain 14.

The motor vehicle 10 has a motor and hydraulic power transmission system (not shown) which drives a pair of front wheels 16 and 17. A steering caster wheel 18, rotatably mounted on the rear section of the frame of the vehicle, is operatively connected to a steering arm 19 that is mounted on the control panel 21. The steering arm 19 is mechanically coupled to the steering caster wheel 18 so that angular movement of the steering arm 19 results in a change of direction of travel of the vehicle 10.

Extended in an upward direction from the drive wheels 16 and 17 is a mast 22 comprising a pair of spaced outer channel beams 23 and 24 and a pair of inner channel beams 26 and 27 positioned in a telescoped relation with respect to the outer channel beams 23 and 24. The lower ends of the outer channel beams 23 and 24 are pivotally mounted on the vehicle frame adjacent the inside of the drive wheels 16 and 17. A cross member 28 is sceured to the upper ends of the inner channel beams 26 and 27.

An upright cylinder assembly 29 for vertically moving the inner beams 26 and 27 relative to the outer beams 23 and 24 is positioned between the beams of the mast 22 with the lower end thereof mounted on the truck frame by a pivotal connection 31. A piston 32 projected from the upper end of the cylinder assembly 29 is connected to a transverse shaft 33 rotatably mounted in a pair of downwardly projected legs 34 secured to the midsection of the cross member 28.

The fork and carriage assembly 11 extends across the front of the mast 22 and is connected to the inner channel beams 26 and 27 by rollers (not shown) engageable with the inside surfaces of the inner channel beams 26 and 27. A pair of roller link chains 36 and 37 vertically support the fork and carriage assembly 11 on the mast 22. Each chain has one of its ends secured to the fork and carriage assembly 11 and from such ends the chains 36 and 37 are trained over sprockets 38 and 39 rotatably mounted on the transverse shaft 33 for connection of their opposite ends to a transverse member 43 secured to the lower rear section of the outer channel beams 23 and 24.

When hydraulic fluid under pressure is supplied to the head end of the cylinder assmebly 29, the piston 32 is forced in an upward direction carrying the inner beams 26 and 27 to an elevated position. The fork and carriage assembly 11 is simultaneously elevated by the action of the chains 36 and 37 which roll over their respective sprockets 38 and 39. When the fluid pressure in the cylinder assembly 29 is released and the hydraulic fluid therein allowed to return to a reservoir (not shown), the piston 32 will move in a downward direction under the weight of the inner channel beams 26 and 27 and the weight of the fork and carriage assembly 11. Movement of the piston 32 in a downward direction thus lowers the fork and carriage assembly 11.

The mast 22 is maintained in an upright position and tilted about the axis of the drive wheels 16 and 17 by a double acting fluid cylinder or motor 41 mounted on the truck frame behind the outer channel beams 23 and 24. The fluid motor 41 is a piston and cylinder assembly which includes a piston rod 42 pivotally connected to the midsection of the transverse member 43. The fluid motor 41 is coupled to the hydraulic fluid system of the truck and is selectively operable by the operator to change the tilt position of the mast 22.

As shown in FIG. 1, the fork and carriage assembly 11 is positioned adjacent the forward side of the mast 22 and comprises a rectangular frame carriage 44 carrying a pair of forwardly projected forks 46 and 47. These forks are substantially identical in construction. Each fork has a forwardly projected finger 48 of a generally rectangular shape in transverse cross section and an upright back 49 carrying a horizontally disposed sleeve 51. A transverse rod 52 projects through the sleeve 51 of each fork to pivotally mount the forks 47 and 48 on the carriage 44. The sleeves 51 are slidably mounted on the rod 52 so as to permit relative transverse adjustment of the forks 46 and 47.

As shown in FIG. 1, the hook attachment 12 is mounted on the fingers 47 of the forks 46 and 47 and comprises a pair of plate members 53 and 54 pivotally coupled to a hook member 56. The chain 14 pendently connects the article 13 with the hook member 56.

The plate members 53 and 54 are identical in construction. The following description is limited to the plate member 53 with corresponding parts in the plate member 54 identified with identical reference numbers having the suffix a. As shown in FIG. 2, plate member 53 has an upper section 57 formed with a pair of rectangular-shaped transversely extended holes 58 and 59 positioned in a side-by-side relation. Each hole has a cross sectional shape corresponding to the cross section shape of the fork fingers 48. The holes 58 and 59 are slightly larger than the fingers to permit movement of the plate along the length of the fingers. The plate member 53 has a triangular-shaped lower section 61 having a central circular hole 62. As shown in FIG. 3, the plate member 53 is bent at its midportion across the width thereof to form an apex section 63 extended substantially parallel to the horizontal plane of the holes 58 and 59. The lower section 61 is disposed at an angle of about twenty degrees with respect to the upper section 57.

Referring to FIG. 4, the hook member 56 is shown as having a ring section 64 and an upwardly open hook section 66. The ring section 64 projects through the holes 62 and 62a in the lower sections of the plate members 53 and 54 which are positioned back-to-back with the apex sections 63 and 63a in adjacent abutting engagement.

In use, when a weight or load indicated by arrow 65 is attached to the hook section 66 and the fork and carriage assembly 11 is moved in an upward direction the apex sections 63 and 63a of the plate members 53 and 54 are in engagement and function as complementary fulcrums for the respective plate members. The concave arcuate surface 67 of the ring section 64 engages the portions of the lower sections 61 and 61a of the plate members forming the holes 62 and 62a and coacts therewith to force the lower sections toward each other in the direction of the arrows 68 and 69. With the plate members 53 and 54 fulcruming on the apex sections 63 and 63a the upper end sections 57 and 57a are spread in opposite directions forcing the outside corners 71 and 72 forming the holes 58 and 58a into gripping engagement with the tops of the fingers 48. In a like manner the inside lower corners 73 and 74 forming the holes 58 and 58a are forced into gripping engagement with the bottom surfaces of the fingers 48 thereby inhibiting the movement of the plates 53 and 54 longitudinally with respect to the fingers 48. The greater the weight on the hook section 66 the greater the lever action of the plate members 53 and 54 and the gripping thereof on the fingers 48.

On removal of the load 65 the plate members 53 and 54 may be released from the fingers 48 by merely turning the hook member 56 about ninety degrees and spreading the lower sections 61 and 61a away from each other thereby moving the upper sections 57 and 57a toward each other to release the gripping action of the corners 71, 72, 73 and 74. The hook attachment 12 is then free to slide in a forward direction for removal from the forks 46 and 47.

In summary, the hook attachment of this invention is usable with an article lift vehicle having forwardly projected finger means movable in up and down directions to selected positions. The hook attachment comprises a pair of plate members which are carried by the finger means and a hook means pivotally coupled to the plate members. When mounted on the finger means the plate members are positioned in mutual pivotal engagement and coact with the hook member to move into a gripping or locking engagement with the finger means.

Although the invention has been described with respect to its preferred embodiment, it is to be understood that it is not to be so limited since changes can be made therein which are within the full intended scope of this invention as defined by the appended claims.

I claim:
1. A hook attachment for an article lift vehicle having a pair of forwardly projected fingers movable in up and down directions comprising:
  (a) a pair of plate members, each plate member having an upper section formed with a pair of first holes for accommodating the forwardly projected fingers and a lower section formed with a second hole, said upper section being angularly disposed with respect to said lower section to form an apex section extended substantially parallel to the plane of the pair of first holes, said plate members when mounted on the fingers being positioned in a back-to-back relationship, and
  (b) hook means having a ring section and a hook section, said ring section extended through the second holes in the lower sections of the plate members whereby when a load is placed on the hook section the adjacent apex sections of the plate members function as complementary fulcrums for the respective plate members for moving the upper sections thereof in opposite directions thereby locking the plate members on the fingers.

2. A hook attachment for an article lift vehicle having at least one forwardly projected finger movable in up and down directions comprising:
  (a) a pair of plate members, each plate member having an upper section including transverse first hole means for accommodating said finger and a lower section including transverse second hole means, said upper section being angularly disposed with respect to said lower section to form an apex section extended across the width of said plate member, said plate members when mounted on the finger being positioned in a back-to-back relationship with the apex sections in engagement with each other, and
  (b) hook means having at least one ring section and at least one hook section, said ring section extended through the second hole means in the lower sections of the plate members whereby when a load is placed on the hook section the engaged apex sections of the plate members function as complementary fulcrum for the respective plate members for spreading apart the upper sections thereof thereby locking the plate members on the finger.

3. A hook attachment for an article lift vehicle having at least one forwardly projected finger movable in up and down directions comprising:
  (a) a pair of plate members, each plate member having an upper section including transverse hole means for accommodating said finger and a lower section, said upper section being angularly disposed with respect to said lower section to form an apex section extended across the width of said plate member, said plate members when mounted on the finger being positioned in a back-to-back relationship with the apex sections in engagement with each other, and
  (b) hook means pivotally coupled to the lower section of each plate member whereby when a load is placed on the hook means the engaged apex sections of the plate members function as complementary fulcrums for the respective plate members for spreading apart the upper sections thereof thereby locking the plate members on the finger.

References Cited by the Examiner
UNITED STATES PATENTS

| | | | |
|---|---|---|---|
| 2,110,515 | 3/1938 | Weaver | 294—92 X |
| 3,019,929 | 2/1962 | Gardner | 214—620 |

GERALD M. FORLENZA, *Primary Examiner.*

G. ABRAHAM, *Assistant Examiner.*